United States Patent
Amemiya et al.

(10) Patent No.: US 12,511,724 B2
(45) Date of Patent: Dec. 30, 2025

(54) IMAGE PROCESSING DEVICE, IMAGE PROCESSING METHOD, AND MAGNETIC RESONANCE IMAGING DEVICE

(71) Applicant: FUJIFILM Healthcare Corporation, Kashiwa (JP)

(72) Inventors: Tomoki Amemiya, Chiba (JP); Atsuro Suzuki, Chiba (JP); Yukio Kaneko, Chiba (JP); Chizue Tanaka, Chiba (JP); Toru Shirai, Chiba (JP)

(73) Assignee: FUJIFILM Corporation, Tokyo (JP)

( * ) Notice: Subject to any disclaimer, the term of this patent is extended or adjusted under 35 U.S.C. 154(b) by 388 days.

(21) Appl. No.: 17/456,229

(22) Filed: Nov. 23, 2021

(65) Prior Publication Data
US 2022/0198608 A1      Jun. 23, 2022

(30) Foreign Application Priority Data
Dec. 17, 2020   (JP) .................. 2020-209610

(51) Int. Cl.
*G06T 5/50*   (2006.01)
*G06N 3/08*   (2023.01)
*G06T 5/80*   (2024.01)

(52) U.S. Cl.
CPC .............. *G06T 5/80* (2024.01); *G06N 3/08* (2013.01); *G06T 5/50* (2013.01); *G06T 2207/10088* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

2005/0184730 A1 * 8/2005 Tamez-Pena ...... G01R 33/4835
                                                                324/302
2018/0293707 A1 * 10/2018 El-Khamy ............ G06T 3/4046

FOREIGN PATENT DOCUMENTS

| CN | 111657858 A | 9/2020 |
|---|---|---|
| JP | 2006-187484 A | 7/2006 |
| JP | 2018-151747 | 9/2018 |
| JP | 2020-006163 A | 1/2020 |
| JP | 2020-121032 | 8/2020 |
| WO | WO2011/018878 | 2/2011 |
| WO | WO2019/124076 A1 | 6/2019 |

OTHER PUBLICATIONS

Lyu, Qing, et al. "Multi-contrast super-resolution MRI through a progressive network." IEEE transactions on medical imaging 39.9 (2020): 2738-2749. (Year: 2020).*

(Continued)

*Primary Examiner* — Vincent Rudolph
*Assistant Examiner* — Meredith Taylor
(74) *Attorney, Agent, or Firm* — Paul Teng

(57) ABSTRACT

A learning model learned to provide high image quality of a first image is generated. A first image and a second image are received from the same target, high image quality of the first image is provided by using the learned model, and a first high image quality image is obtained. By using the first high image quality image and the second image as inputs, a high image quality image of the second image having the image quality of the first high image quality image is generated while maintaining contrast of the second image.

18 Claims, 10 Drawing Sheets

(56) References Cited

OTHER PUBLICATIONS

McDonagh, et al. "Context-sensitive super-resolution for fast fetal magnetic resonance imaging." Molecular Imaging, Reconstruction and Analysis of Moving Body Organs, and Stroke Imaging and Treatment: 5th International Workshop, CMMI 2017, Québec City, QC, Canada, Sep. 14, 2017, Proceeds 5. (Year: 2017).*
IXI. Accessed: Feb. 8, 2024 [Online]. Available: https://braindevelopment.org/ixi-dataset/ (Year: 2012).*
Zheng, Hong, et al. "Multi-contrast brain MRI image super-resolution with gradient-guided edge enhancement." IEEE access 6 (2018): 57856-57867. (Year: 2018).*
Japanese official action dated Sep. 17, 2024 (and English translation thereof) in connection with Japanese Patent Application No. 2020-209610.
Yicheng Chen, et al., "QSMGAN: Improved Quantitative Susceptibility Mapping using 3D Generative Adversarial Networks with increased receptive field", NeuroImage, 207 116389, pp. 1-10 (2020).
Ziwu Zhou, et al., "Parallel imaging and convolutional neural network combined fast MR Image reconstruction: Applications in low-latency accelerated real-time imaging", Med. Phys., 46(8), pp. 3399-3413 (2019).
Feb. 25, 2025 Chinese official action (and English-language translation thereof) in connection with Chinese Patent Application No. 2021115460493.
Mar. 11, 2025 Japanese official action (and English-language translation thereof) in connection with Japanese Patent Application No. 2020-209610.
Jul. 24, 2025 Chinese official action (and English-language translation thereof) in connection with Chinese Patent Application No. 2021115460493.

* cited by examiner

IMAGE PROCESSING DEVICE, IMAGE PROCESSING METHOD, AND MAGNETIC RESONANCE IMAGING DEVICE

BACKGROUND OF THE INVENTION

1. Field of the Invention

The present invention relates to an image processing technique for providing high image quality of an image obtained by a medical imaging device such as a magnetic resonance imaging (hereinafter referred to as MRI) device or the like.

2. Description of the Related Art

Generally, an MRI examination executes a plurality of imaging sequences, and acquires a plurality of types of images. The imaging sequence describes an application timing of a radiofrequency magnetic field (RF) and a gradient magnetic field (Gs, Gp, and Gr) in each axial direction, and various types are used depending on a type of image to be captured. The MRI examination performs a diagnosis based on a plurality of types of images obtained by executing a plurality of sequences.

Parameters that determine the imaging sequence (repetition time TR, echo time TE, inversion time TI, flip angle FA, or the like) are referred to as imaging parameters, and a degree of a weighted image obtained by imaging is determined by a type of sequence (spin echo, gradient echo, EPI, or the like) and the imaging parameters. The imaging parameters are adjusted in various ways depending on a target portion, a disease, or the like.

As described above, the examination for acquiring a plurality of types of images takes a long time, which causes a heavy burden on both a patient and an examiner. Therefore, in the MRI examination, imaging is performed with low resolution in order to shorten the examination time. In this case, a ringing artifact (also referred to as a truncation artifact) occurs when a high frequency component of an echo signal is truncated. The ringing artifact is an artifact that appears in a fine stripe around an image, and a general method for preventing the ringing artifact is a method of applying a low pass filter to the image. However, when the low pass filter is applied to the image, blurring may occur.

On the other hand, in recent years, a technique for improving an image having low image quality to obtain an image having high image quality by machine learning is developed, and is widely applied to a medical image such as an MR image or the like. For example, JP-A-2020-121032 discloses a high image quality technique using a model learned to output a corrected image that reduces an influence of inhomogeneity of a radiofrequency magnetic field by inputting a low frequency component image. JP-A-2018-151747 discloses a method of using a two-stage neural network (NN) which, starting from a first resolution image having low resolution and via a second resolution image having higher resolution than that of the first resolution image, obtains a third resolution image having higher resolution than that of a second resolution image. By estimating a high resolution image from a low resolution image by using such machine learning, it is expected that the above-described ringing is reduced and blurring is also reduced.

SUMMARY OF THE INVENTION

However, in a high image quality obtained by machine learning using a learning model and NN of related art, although a highly accurate result can be obtained in an image having the same imaging condition (contrast and resolution) as that of an image at the time of learning, there is a problem that accuracy deteriorates in an image having a different imaging condition. It is difficult to learn images of all the imaging conditions in advance in consideration of time and the number of data.

The present invention has been made in consideration of the above-described circumstances, and an object thereof is to perform high image quality processing with high accuracy regardless of a type of an input image.

The present invention solves the above-described problems by performing high image quality processing on one image and performing second high image quality processing on another image by using a result thereof.

An image processing device of the present invention includes: an image receiving unit configured to receive, from the same target, a first image and a second image having a different type from that of the first image; a first high image quality processing unit configured to provide high image quality of the first image received by the receiving unit by using a high image quality function learned to provide the high image quality of the first image; and a second high image quality processing unit configured to provide high image quality of the second image by using a first high image quality image generated by the first high image quality processing unit and the second image.

Here, "an image having a different type" indicates an image different in at least one of a type of device (modality) used for imaging, conditions at the time of imaging (a degree of emphasis (contrast) of a biological tissue and a physical quantity, an imaging parameter, an imaging sequence, or the like), and imaging time (an imaging date and time, an elapsed time after administration of a contrast agent, a respiratory phase, a heartbeat phase, or the like).

An image processing method of the present invention includes: a learning step of generating a first high image quality function learned to provide high image quality of a first image; an image receiving step of receiving, from the same target, a first image and a second image; a first high image quality step of providing high image quality of the first image received in the image receiving step by using the first high image quality function; and a second high image quality step of providing high image quality of the second image by inputting a first high image quality image obtained in the first high image quality step and the second image received in the image receiving step.

An MRI device of the present invention includes: an imaging unit configured to generate a nuclear magnetic resonance signal in an examination target, and to collect the nuclear magnetic resonance signal generated from the examination target; and a computer configured to process the nuclear magnetic resonance signal and generate an image, in which the computer has functions of the image processing device of the present invention.

According to the present invention, high image quality can be obtained for various images without preparing a high image quality function for each type of an image. According to the present invention, it is possible to shorten time and obtain high image quality in an MRI examination that acquires a plurality of images at one time.

DESCRIPTION OF THE PREFERRED EMBODIMENTS

Figure 1:
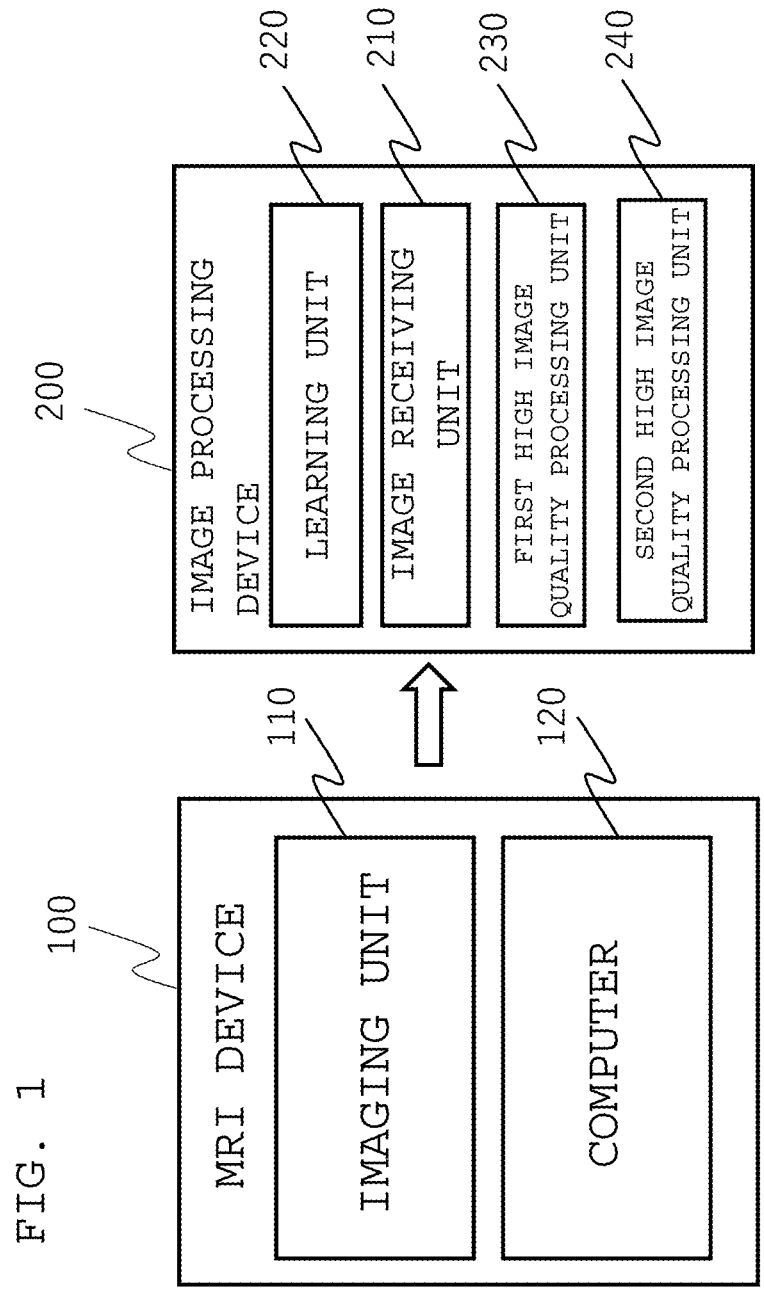
FIG. 1 is a block diagram illustrating an embodiment of an image processing device and a medical imaging device.

Hereinafter, embodiments of the present invention will be described with reference to the drawings.

First, an overall configuration of an image processing device will be described with reference to FIG. 1. An image processing device 200 is a device that receives an image captured by a medical imaging device 100 and performs high image quality processing, and includes: an image receiving unit 210 that receives an image; a high image quality processing unit (a first high image quality processing unit 230 and a second high image quality processing unit 240) that performs high image quality processing on the image received by the image receiving unit 210; and a learning unit 220 that generates a high image quality function (for example, a learning model) used by the high image quality processing units 230 and 240.

The image receiving unit 210 receives at least two different types of images. These two types of images may be images directly transmitted from the medical imaging device 100, or may be images stored in a medical image database or the like such as PACS. The medical imaging device 100 indicates one device in FIG. 1, and may be a plurality of imaging devices having different modalities such as an MRI device, a CT device, or the like, and a plurality of imaging devices installed at different locations. In addition to the images obtained by different medical imaging devices, two types of images also include images having different contrasts, imaging parameters, imaging times, or the like, even though images are acquired by the same medical imaging device. When the medical imaging device 100 is the MRI device, for example, various images, such as a T1W image, a T2W image, a FLAIR image, or the like, having different contrasts can be obtained by having various imaging sequences and imaging parameters. These images may be acquired at the same time in one examination, or may be acquired at different times. In the embodiment, these images are processed as "different types of images" (a first image and a second image).

The high image quality processing unit includes the first high image quality processing unit 230 that processes a first image received by the image receiving unit 210 as an input; and the second high image quality processing unit 240 that processes both a high image quality image output from the first high image quality processing unit 230 and a second image received by the image receiving unit 210 as inputs. As a high image quality function (an algorithm) of the high image quality processing, the first high image quality processing unit 230 can adopt a convolutional neural network (CNN) and a well-known machine learning algorithm, or a method for generating a dictionary by using only a high image quality image (sparse modeling and sparse coding).

The second high image quality processing unit 240 uses the high image quality image (a first high image quality image) of the first image as a guide image, and provides high image quality of the image (the second image) different from the first image, such that as an algorithm thereof, filters such as a joint bilateral filter, a guided filter, or the like can be used to smooth an edge while preserving the edge. An unsupervised learning model such as generative adversarial networks (GAN) may also be used. Details of processing will be described later.

The learning unit 220 generates the high image quality function (the learning model) to be used by the high image quality processing unit 230. Specifically, a set including a large number of first images and high image quality images thereof is used as a learning image, and the first image is used as an input to learn an unlearned model so as to output the high image quality image. The high image quality image of the first image is, for example, an image of which type is the same as that of the first image and which has higher resolution than that of the first image, or an image in which an artifact such as a rigging artifact, noise, or the like is removed, and uses an image acquired under high resolution imaging conditions and an image acquired under imaging conditions where the artifact is not generated. The first image and the high image quality image thereof are stored as a large number of sets, for example, in the database, and are received by the image receiving unit 210 and delivered to the learning unit 220. When one type of image (the first image) is input to the learning model (the CNN, or the like), the learning unit 220 determines a weight and a coefficient so that the learning model outputs the high image quality image of the image. As described above, while a set of a low image quality image and a high image quality image is used as a learning method of the learning model, only the low image quality image may be used depending on a content of the high image quality processing.

Figure 2:
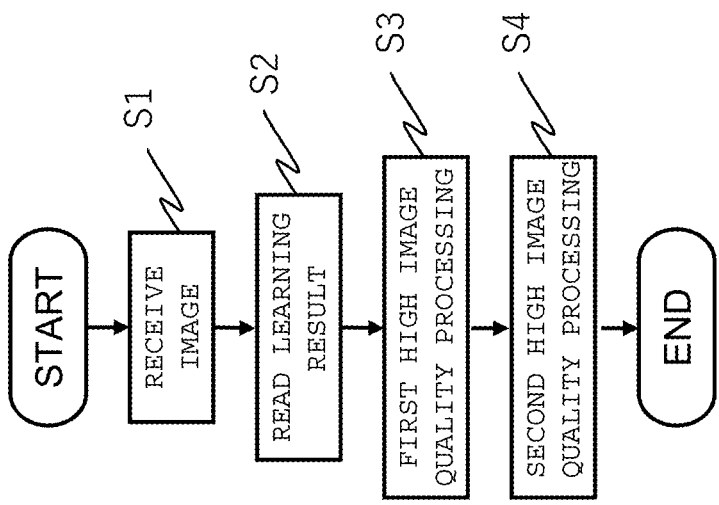
FIG. 2 is a diagram illustrating an operation flow of the image processing device of FIG. 1.

An operation of the image processing device of the embodiment in the above-described configuration will be described with reference to FIG. 2. Here, it is assumed that the learning model used by the first high image quality processing unit 230 is already learned by the learning unit 220.

First, the image receiving unit 210 receives a plurality of types of images (a first image and a second image) which are targets to be processed (S1). The first high image quality processing unit 230 reads a result learned by the learning unit 220 (for example, a weighting coefficient of the CNN) (S2), and performs high image quality processing on the first image (S3). Next, the second high image quality processing unit 240 uses a first high image quality image, which is a processing result of the first high image quality processing unit 230, as a guide image, and performs high image quality processing on the second image (S4). By the above-described processing, a high image quality image can be obtained for each of the plurality of types of images inputted.

By the above-described processing, it is possible to provide the high image quality of each image with high accuracy without constructing a learning model using a large number of teacher data for each of the different types of images. While the case in which two different types of images are input is described here, a plurality of second high image quality processing units 240 are provided or processing by the second high image quality processing unit 240 is performed in multiple stages, thereby making it possible to perform the same processing when three or more types of images are input. When a plurality of second high image quality processing units 240 are provided, an algorithm to be adopted may be appropriately different depending on the type of image.

First Embodiment

Next, an embodiment in which the medical imaging device 100 is an MRI device and a plurality of images acquired by the MRI device are processed will be described.

As illustrated in FIG. 1, the medical imaging device 100 roughly includes an imaging unit 110 and a computer 120. A configuration of the imaging unit 110 and a function of the computer 120 vary depending on a type of the medical imaging device 100, and in the case of the MRI device, although not illustrated herein, the imaging unit 110 includes a static magnetic field magnet that generates a static magnetic field, a gradient magnetic field coil that generates a gradient magnetic field in a static magnetic field space, an RF transmission coil that applies a pulsed radiofrequency magnetic field to a subject disposed in the static magnetic field space, and a RF receiving coil that detects a nuclear magnetic resonance signal (an echo signal) generated from an atomic nucleus (a proton or the like) that forms a tissue of the subject by applying a radiofrequency magnetic field. The imaging unit 110 further includes a power supply or radiofrequency magnetic field generator that drives the gradient magnetic field coil and the RF transmission coil, a signal processing unit that processes the signal received by the RF receiving coil, and a sequencer that controls the application of a radiofrequency magnetic field pulse and a gradient magnetic field pulse according to a predetermined pulse sequence and the measurement of the echo signal.

The computer 120 can be configured with a general-purpose computer and workstation including a CPU, a GPU, and a memory, and includes a control unit that controls an operation of the entire device, a calculation unit that performs calculation such as image reconstruction or the like using the signal processed by the signal processing unit, and a user interface unit (including a display device and an input device) for displaying a processing result, and performing a data input and a command input from a user.

The image processing device 200 illustrated in FIG. 1 may be built in the computer 120, or may be a device independent of the MRI device. It is also possible to implement a part of the functions (for example, a part of the calculation) performed by the computer 120 and the image processing device 200 with hardware such as a programmable logic device (PLD) or the like.

Figure 3:
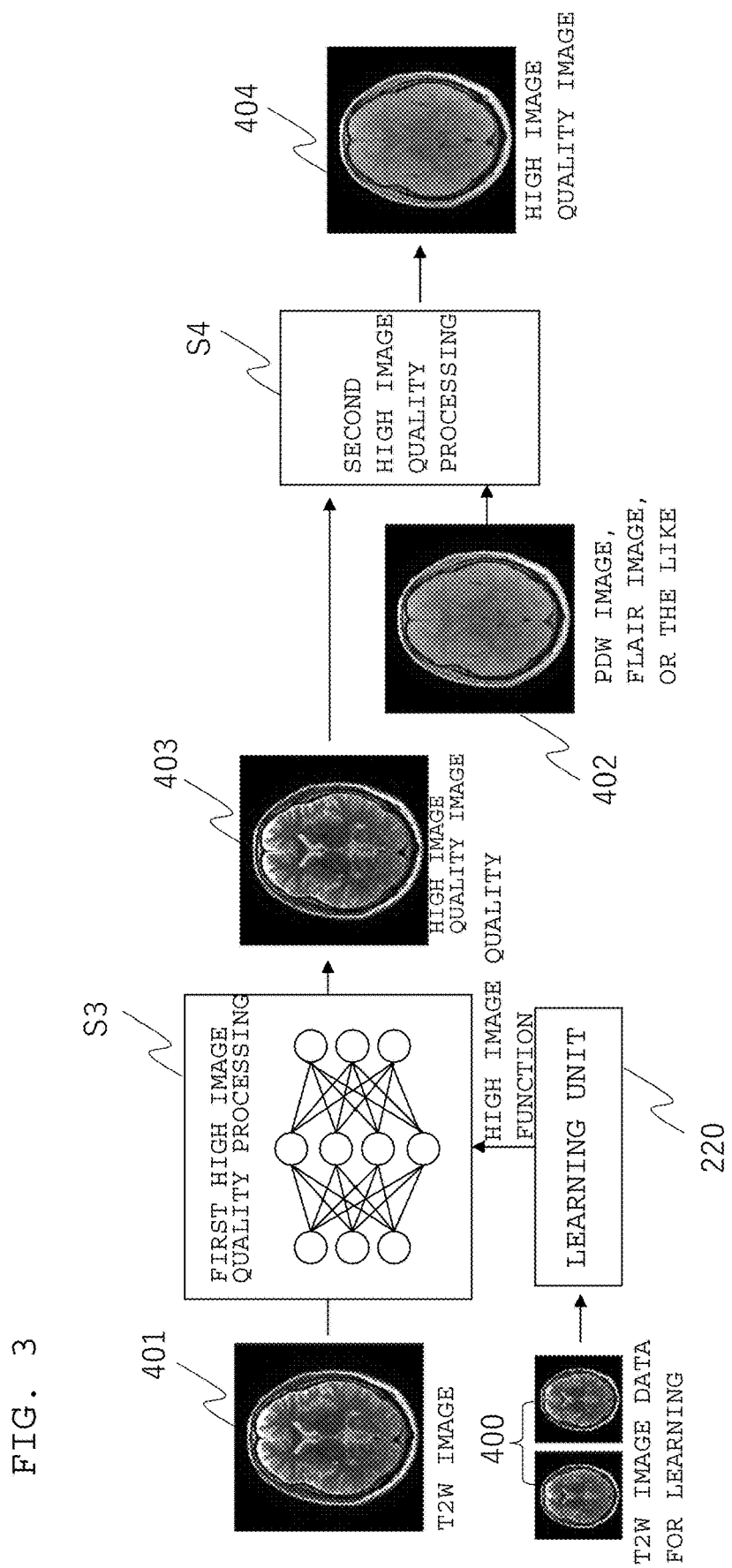
FIG. 3 is a diagram illustrating an outline of processing of an image processing device of a first embodiment.

The embodiment will describe a case as an example in which the image processing device 200 (including a case where the image processing device 200 is built in the MRI device) learns a T2-weighted image (a T2W image) which is necessary for many MRI examinations as the first image. Since the configuration of the image processing device illustrated in FIG. 1 and the processing flow illustrated in FIG. 2 are common to this embodiment as well, the following descriptions also refer to FIGS. 1 and 2. FIG. 3 illustrates an outline of the processing of the embodiment.

[Learning Step]

As illustrated in FIG. 3, first, the learning unit 220 learns a high image quality function used by the first high image quality processing unit 230 by using a set 400 of T2W image data for learning. In the embodiment, the CNN is used as the high image quality function. In the set 400 of T2W image data for learning, one is a low image quality T2W image and the other one is a high image quality T2W image. The learning unit 220 uses a large number of image data for learning to determine a weight of the CNN, an activation function, or the like so that an output of the CNN becomes the high image quality T2W image with respect to an input of the low image quality T2W image.

As is well known, the CNN includes a plurality of convolutional layers and optimizes parameters such as a weight coefficient and bias of the convolutional layers, thereby obtaining a desired output (an output similar to teacher data). Various layer structures of the CNN are proposed, and it is also possible to form a structure including a layer having a different property such as a pooling layer or the like in addition to the convolution layer. The layer structure and activation function of the CNN can be predetermined, and can also be appropriately selected according to a target image and a processing content of the high image quality. A plurality of CNNs may be prepared and selected according to the processing content thereof.

For example, when the high image quality by the first high image quality processing unit 230 is high resolution processing, the learning unit 220 may prepare several patterns having different R/M depending on a ratio of the number of reconstruction matrices (an image size) R of the first image to the number of measurement matrices M (either one of the number of phase encoding and the number of frequency encoding), in the structure and learning of the CNN (the layer structure and the activation function). It is known that a ringing interval caused by zero fill is roughly proportional to [the number of reconstruction matrices R]/[the number of measurement matrices M], and even though the number of matrices R and M of an image obtained in the examination (an image to be processed) varies, it is considered that ringing can be removed with high accuracy when the R/M is the same. Therefore, by selecting and using the CNN that matches the R/M to be processed, even though the number of reconstruction matrices R and the number of measurement matrices of the image to be processed vary, high resolution processing with high accuracy can be performed. Since learning can be performed with several patterns having different R/M, learning data to be required is reduced.

[First High Image Quality Processing]

The image processing device 200 provides the high image quality of a plurality of images to be processed on the assumption of learning the CNN by the learning unit 220 described above. The image receiving unit 210 receives a plurality of types of images 401 and 402 (S1). One of the plurality of types of images is the T2W image 401, and the other 402 is a proton density weighted (PDW) image or a FLAIR image, and both thereof are low quality images, for example, low resolution images obtained by high speed imaging.

Among the plurality of received images, the T2W image 401 is first processed by the first high image quality processing unit 230, and a high image quality image of T2W (for example, a high resolution image) 403 is output. At this time, when the first high image quality processing unit 230 includes a plurality of CNNs corresponding to the image reconstruction matrix/the measurement matrix (R/M), the CNN corresponding to the R/M of the input T2W image is selected and processed (S2 and S3).

As described above, the processing of the first high image quality processing unit 230 is described with the CNN as an example, and in addition to the CNN, other machine learning methods and sparse modeling can be used as the high image quality function.

[Second High Image Quality Processing]

The second high image quality processing unit 240 inputs the high image quality image 403 of T2W, which is the output of the first high image quality processing unit 230, and the image (for example, a PDW image) 402 other than the T2W image received by the image receiving unit 210, and performs the high image quality processing (S4). The second high image quality processing is processing for providing the high image quality of the image to be processed by using the high image quality image of T2W as a guide image or a reference image, and a guided filter, a joint bilateral filter, a GAN, or the like are used as the high image quality function.

Hereinafter, the high image quality processing using the guided filter will be described with reference to FIG. 4.

Figure 4:
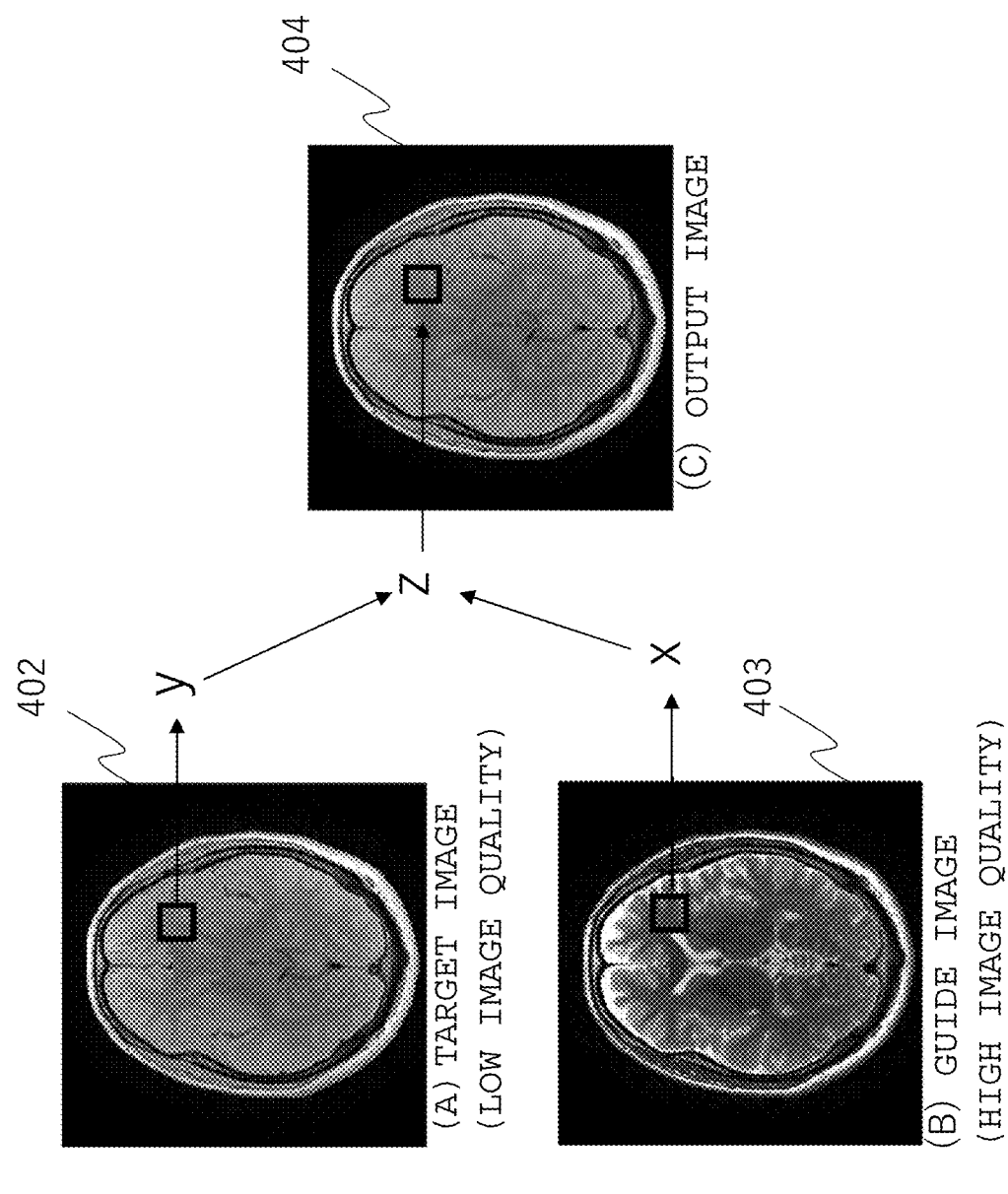
FIG. 4 is a diagram illustrating an example of second high image quality processing of the first embodiment.

(A) in FIG. 4 illustrates the image to be processed (for example, the PDW image) 402, (B) in FIG. 4 illustrates the high image quality image 403 of T2W, and FIG. (C) in FIG. 4 illustrates an output image 404 of the second high image quality processing unit 240. In the processing using the guided filter, first, pixels in a predetermined patch of the two images of the image 402 and the image 403 are extracted. When a pixel value of the image 402 is set to y and a pixel value of the image 403 is set to x, a coefficient a and an intercept b are calculated by obtaining an approximation with the following equation (1):

$$y = ax + b \quad (1)$$

By using the coefficient a and the intercept b, a value z is calculated with the following equation (2):

$$z = ax + b \quad (2)$$

After that, the value z is used as an output pixel value in this patch.

The processing is performed for all the patches while moving a patch position. At this time, the patches move so that adjacent patches overlap each other. With respect to the pixels of an overlapping portion of the patches, an average value of the pixel values obtained for each patch is used as the pixel value of the corresponding pixel of the final output image 404. By performing the above-described processing, the output image 404 in which noise (a ringing artifact) in the target image 402 is removed and an edge of the target image 402 is maintained can be obtained. That is, an image which is the same type as the target image 402 and has high image quality can be obtained.

As another example of the filter used in the second high image quality processing unit 240, processing using the joint bilateral filter will be described with reference to FIG. 4 again. In the same manner as that of the guided filter, the joint bilateral filter is a filter that smooths the edge while preserving the edge, and the pixel value of the output image 404 is calculated with the following equation (3) by using a pixel value of a neighboring pixel.

$$Z = \frac{1}{k(p)} \sum_{p' \in \Omega} q_d(p' - p) g_r(X_{p'} - X_{p'}) Y_{p'} \quad (3)$$

In the equation, p represents a coordinate of the pixel, p' represents a coordinate of the pixel included near (Ω) of p, X represents a pixel value of the guide image 403, Y represents a pixel value of the image 402 to be processed, and each subscript represents coordinates of the pixel. In the above equation, g (gd, gr) is a Gaussian function. gd (p–p') represents a spatial weight, and a weight is large when a distance is short. gr (Xp–Xp') represents a weight based on the pixel value, and the weight is large when the pixel value is close.

"1/ k(p)" represents a coefficient that sets the sum of weights to 1, and k(p) is represented by the following equation.

$$k(p) = \Sigma_{p' \in \Omega} g_d(p' - p) g_r(X_p - X_{p'}) \quad (4)$$

As described above, in the joint bilateral filter, in addition to the spatial weight, a weight of a pixel close to a luminance value of the guide image 403 increases, such that an output image that reflects the edge of the guide image is obtained.

Figure 5:
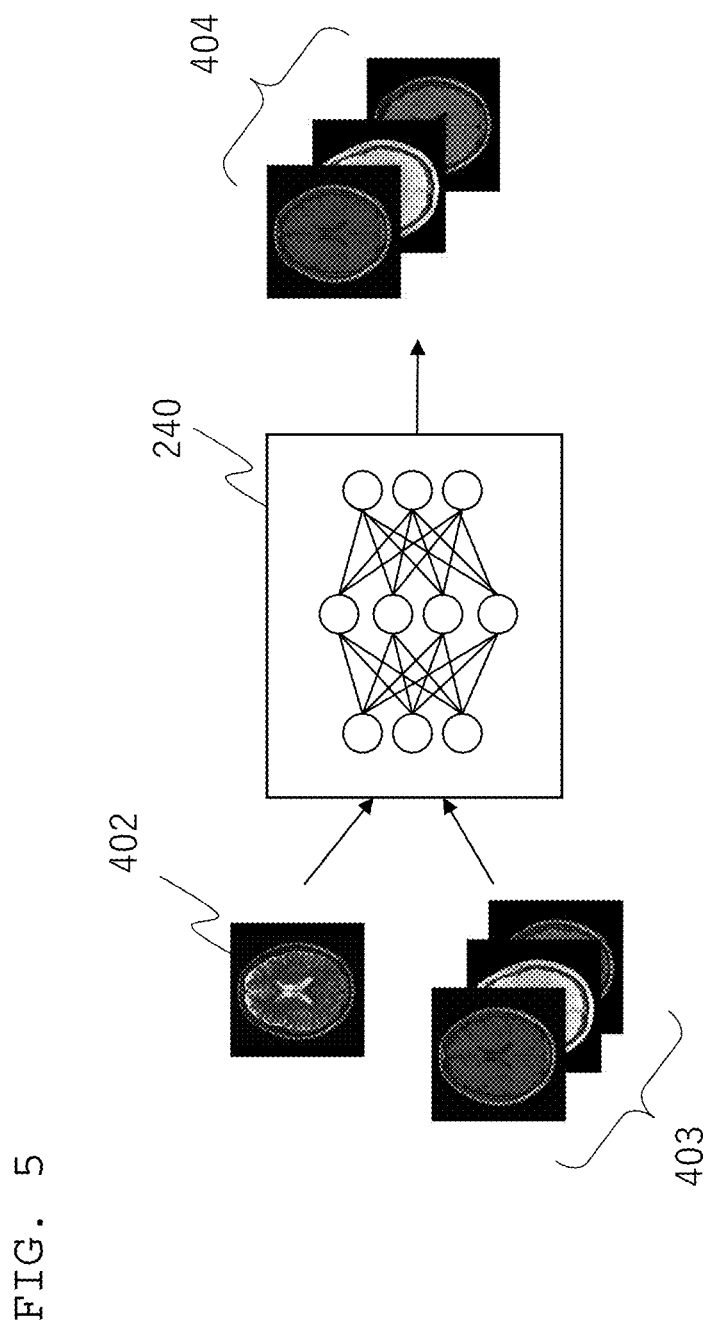
FIG. 5 is a diagram illustrating another example of the second high image quality processing of the first embodiment.

It is also possible to use a neural network (NN) instead of the above-described filter as the high image quality function of the second high image quality processing unit 240. Processing using the NN will be described with reference to FIG. 5. In FIG. 5, 402 is the first high image quality image (here referred to as a source image), 403 is the second image(s) (here referred to as the target image), and 404 is the output image(s) of the NN 240. In this processing, a structure of the source image 402 is maintained and converted into an appearance of the target image 403 (an appearance characteristic such as contrast or the like). In the illustrated example, a plurality of types of images are used as the target image, the characteristics of respective appearances are specified, and a plurality of images of which structure is the source image and of which appearance becomes each target image are obtained.

Therefore, at the time of learning, learning is performed by inputting a pair of the first image (the T2W image) and various different images (the PDW image, the FLAIR image, or the like), and the NN, in which the source image is converted into the appearance (the contrast or the like) specified by the target image, is constructed. That is, the conversion processing is learned. At the time of use, the first high image quality image, which is the output of the first high image quality processing unit 230, is set as the source image 403, and the second image received by the image receiving unit 210 is input as the target image 402, thereby obtaining an image obtained by converting the first high image quality image into the appearance of the second image, that is, the second high image quality image 404.

In this high image quality processing, the conversion processing itself is learned, such that even though an image having imaging conditions different from that at the time of learning is input as the target image as the second image 402, a high image quality image can be output.

As described above, according to the embodiment, it is possible to perform the high image quality processing with high accuracy without depending on the imaging conditions or the like of the second image.

Modification of First Embodiment

The first embodiment describes an example in which the high image quality processing is performed by inputting the first image and the second image, and by using a third image and a third high image quality image, it is also possible to improve the accuracy of the high image quality processing (the second high image quality processing) of the second image. In the MRI examination, since three or more types of images are often acquired, these images can be used for the third image and the third high image quality image.

An example of the high image quality processing using the third image will be described by taking a case of using the guided filter as an example.

Figure 6:
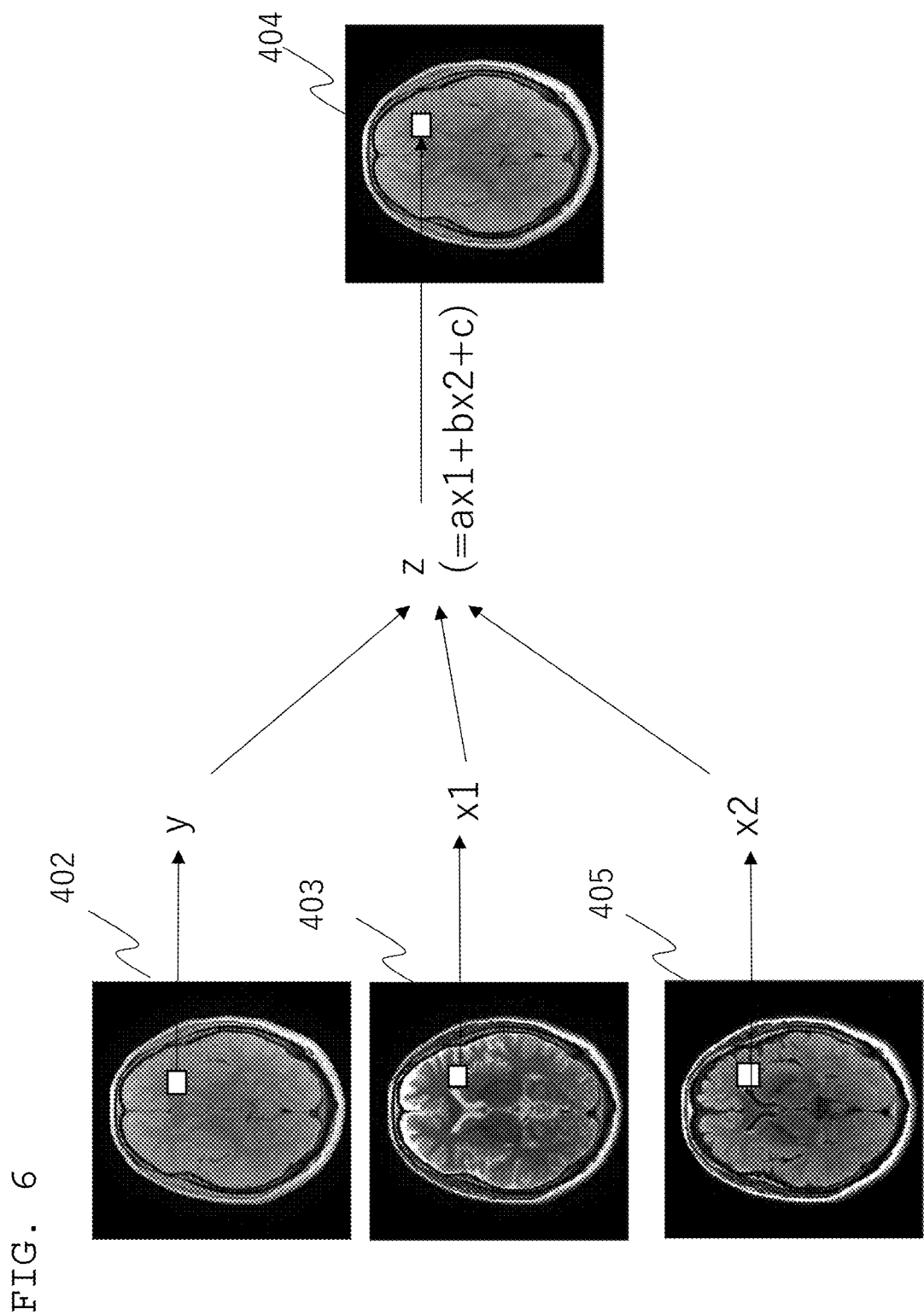
FIG. 6 is a diagram illustrating still another example of the second high image quality processing of the first embodiment.

In this modification, as illustrated in FIG. 6, for example, three images including the second image to be processed (the image to be processed) 402, the first high image quality image 403, in which the first image becomes the high image quality image by the first high image quality processing unit 230, and a third high image quality image 405 are input to the second high image quality processing unit 240. The third high image quality image 405 is an image of a different type from the first image and the second image, and as described above, when the first image is the T2W image and the second image is the PDW image, the third image is the FLAIR image or the like. The high image quality image 405 of the third image may be used as it is when the third image is acquired under high resolution imaging conditions, or may be improved in the image quality by high image quality processing such as well-known filter processing or the like.

In the same manner as that of using two types of images, the second high image quality processing unit 240 uses pixel values of patches of respective corresponding portions (a pixel value y of the image 402, a pixel value x1 of the image 403, a pixel value x2 of the image 405), and obtains coefficients a and b and an intercept c of equation (5).

$$y = ax1 + bx2 + c \quad (5)$$

By using the coefficients a and b and the intercept c, an output pixel value z in this patch is calculated.

$$z = ax1 + bx2 + c \quad (6)$$

This is calculated for all the patches, and the pixel values z of overlapping pixel positions are averaged to obtain the pixel value of the second high image quality image 404.

The accuracy of the second high image quality image 404 can be improved by using not only the first high image quality image 403 but also the third image or the third high image quality image 405 in this manner.

The modification is described by taking the case of using the guided filter as an example, and even when the joint bilateral filter and the NN are used as the high image quality function, it is possible to use the third image and the third high image quality image.

Other Modifications

The above-described embodiment describes a case in which the high image quality processing is mainly performed to provide the high resolution of the low resolution image. The high image quality processing is performed when the input images (the first image and the second image) are noisy images and the noise is reduced, and when an image is under-sampled in a k-space and artifact noise caused by the image is removed, and includes processing for reducing the artifact such as body movement and respiration, and processing in which the processing and the high resolution processing are appropriately combined. Any case can be implemented by using pre-processed and post-processed learning data for one type of image, and by designing and learning the high image quality function (for example, the CNN) used in the first high image quality processing unit 230.

Second Embodiment

In the first embodiment and the modification thereof, the first high image quality image is used to provide the high image quality of the second image, and the second embodiment is characterized in that local processing is performed in consideration of noise that may exist in the first image and local structural inconsistency between the first image and the second image.

The processing of the second high image quality processing unit of the first embodiment is performed based on the assumption that the same structure can be seen between the images, but a locally different structure may be seen depending on the imaging conditions. For example, in a T2*W image, blood and blood vessels are depicted in black, whereas in a DWI image, a cerebral infarction portion is depicted in white, such that when bleeding occurs, a structure of the portion looks different in both images. In this portion, there is a high possibility that more blurring occurs after the high image quality. Even when an image serving as a guide (the first high image quality image) has noise, the accuracy of the high image quality deteriorates. In the embodiment, deterioration of the high image quality processing is prevented by performing the local processing.

Figure 7:
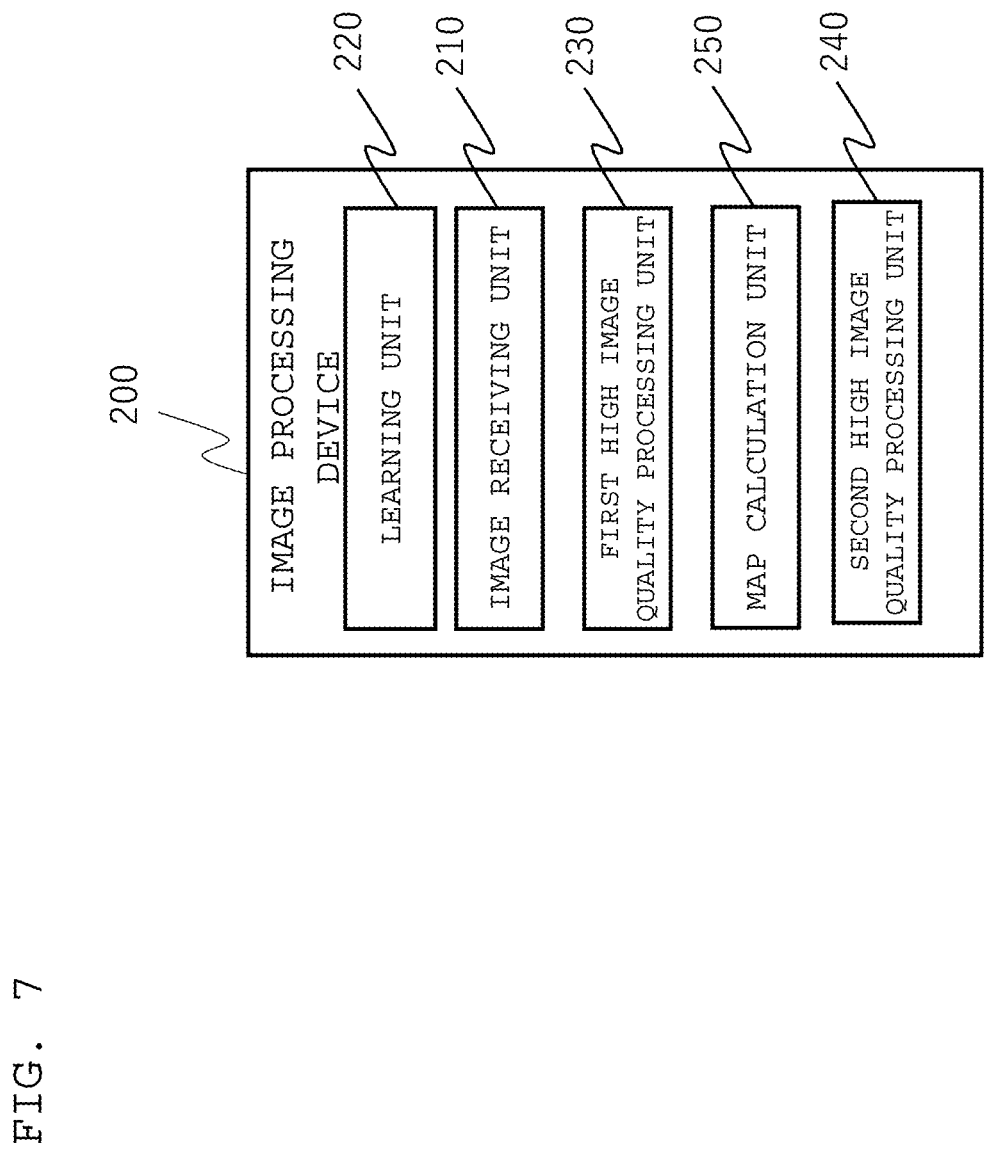
FIG. 7 is a block diagram illustrating an overall configuration of an image processing device according to a second embodiment.
Figure 8:
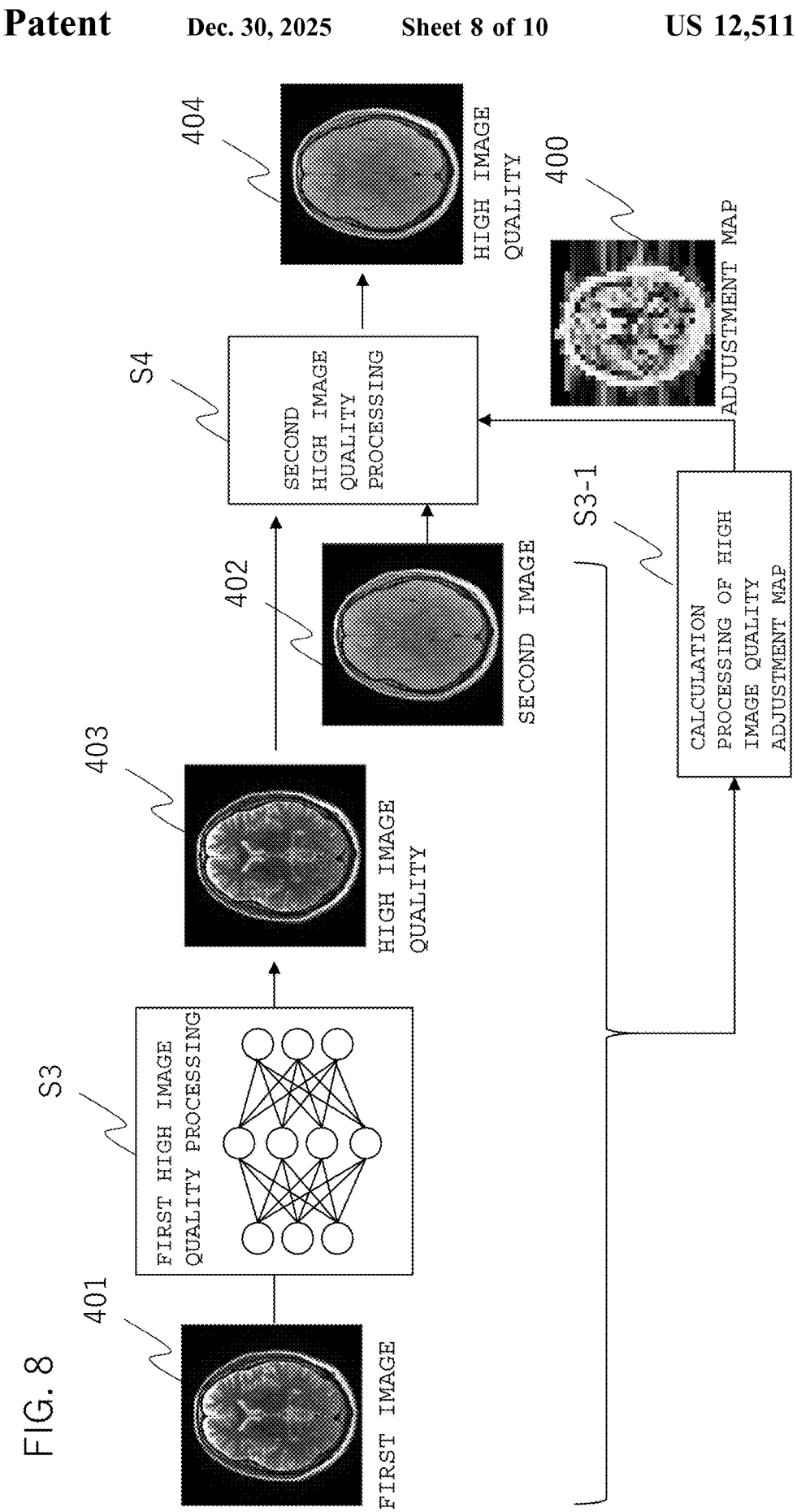
FIG. 8 is a diagram illustrating an outline of processing of the image processing device according to the second embodiment.

As illustrated in FIG. 7, in the image processing device 200 of the embodiment, a map calculation unit 250 that generates an adjustment map for adjusting the high image quality processing is added to the configuration illustrated in FIG. 1. As illustrated in FIG. 8, a content of the image processing is different in that the adjustment map calculated by the map calculation unit 250 is used in the second high image quality processing (addition of adjustment map calculation processing S3-1). Hereinafter, the second embodiment will be described, focusing on a difference from the first embodiment.

In this embodiment as well, the first high image quality processing unit 230 performs the high image quality processing on the first image in the same manner as that of the first embodiment, and the high image quality function (for example, the CNN learned by the learning unit 220) used by the first high image quality processing unit 230 is also the same. The map calculation unit 250 calculates the adjustment map 400 by using any one of the first image 401 and the second image 402 received by the image receiving unit 210, and the first high image quality image 403. For the same subject, when the third image is acquired in addition to the first image and the second image, the third image may be used.

The adjustment map 400 is an image in which a weight for weighting each pixel value or each patch is used as a pixel value when the first high image quality image 403 and the second image 402 are used to provide the high image quality, and the weight is calculated based on reliability of each pixel of the image used to generate the map and a correlation between the images. Specifically, for example, when the adjustment map 400 is calculated by using the first image 401 or the first high image quality image 403 alone, local dispersion and entropy of the image are calculated, and a weight w ($0 \leq w \leq 1$) is calculated based on the dispersion and entropy and used as the pixel value of the map. The local dispersion and entropy both indicate a variation in the pixel value, and it is considered that as the variation increases, the noise is more likely to be included (reliability deteriorates), such that a value of weight is set to a pixel value that reduces the value thereof. The same also applies when the third image is used.

When the first image 401 or its high image quality image 403 and the second image 402 are used, a local correlation coefficient between the images, an amount of mutual information, or the like are calculated and used as the pixel value. It can be said that as the correlation between the two images is high, similarity of the structures is high, such that a value of the weight w is set to a pixel value that increases the value thereof. A map obtained by synthesizing a plurality of different maps may be used as the adjustment map.

The adjustment map 400 may not be a map of the entire area of the image. For example, when a user has knowledge about an area where bleeding is expected and an area where noise is likely to be mixed, an image representing an area of interest such as a segmentation image extracted from a specific area, an edge extraction image, or the like may be generated, and a map of only the area of interest may be generated.

Next, an example of processing of the second high image quality processing unit 240 using the above-described adjustment map will be described. As a function used for the high image quality processing, the guided filter, the joint bilateral filter, the GAN, or the like can be used in the same manner as that of the first embodiment.

Figure 9:
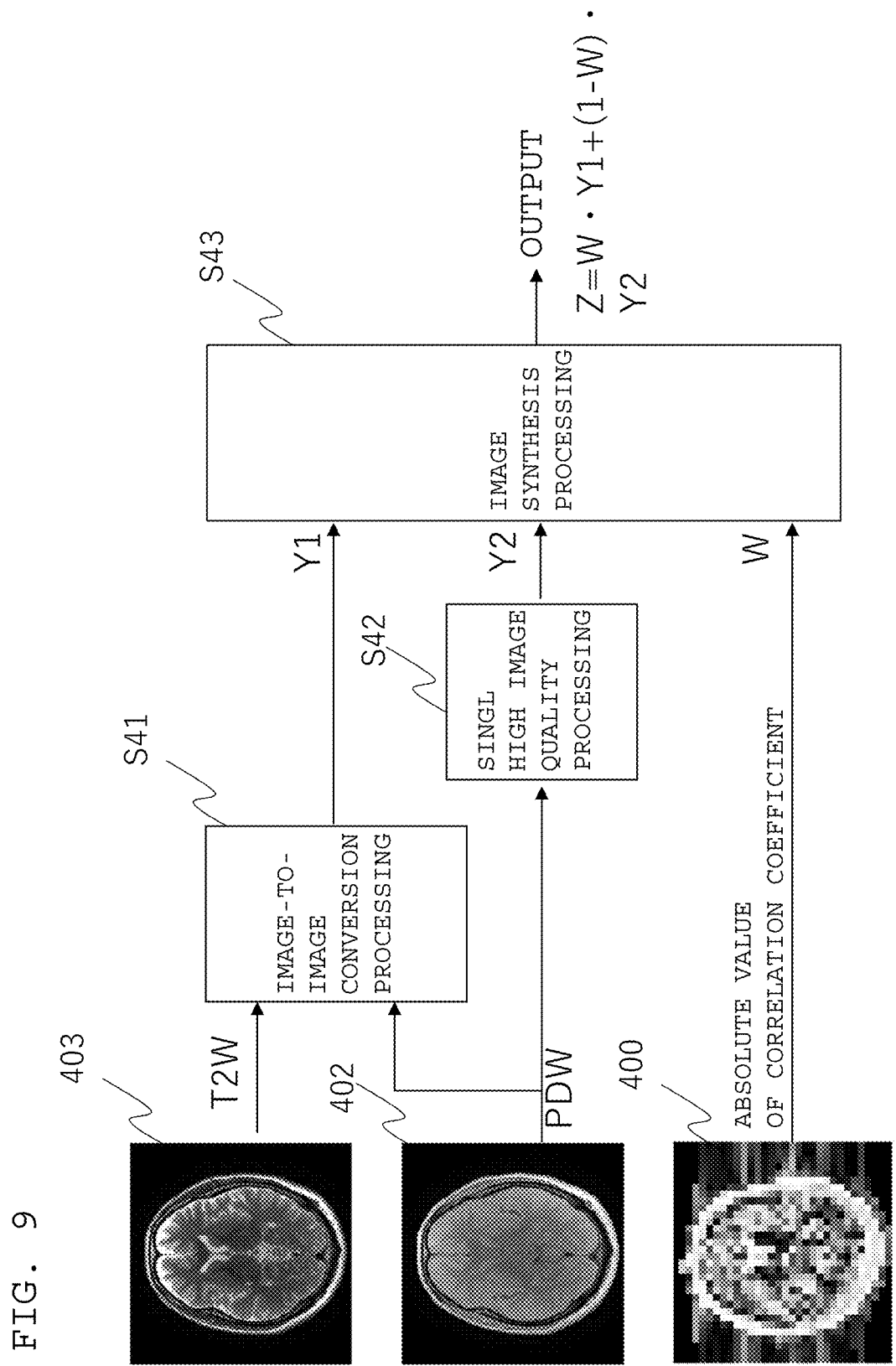
FIG. 9 is a diagram illustrating an example of second high image quality processing of the second embodiment.

As illustrated in FIG. 9, the second high image quality processing S4 includes image-to-image conversion processing S41, single high image quality processing S42, and image synthesis processing S43. The image-to-image conversion processing S41 is the same processing as that of the second high image quality processing S4 illustrated in FIG. 3, and uses the first high image quality image 403 as a guide image to provide the high image quality of the second image. In the illustrated example, the processing is conversion processing of the PDW image using the T2W image as a guide. An output of this processing is set to Y1.

The single high image quality processing S42 uses the second image 402 as an input and performs general high image quality processing such as a bilateral filter, sequential reconstruction using spars constraints, and CNN learned from a plurality of types of images. This processing is general processing using only the second image, and is different from the second high image quality processing S4 of FIG. 3. An output of this processing is set to Y2.

In the image synthesis processing S43, two high image quality images Y1 and Y2 are synthesized by using the adjustment map 400. The adjustment map 400 is, for example, an absolute value of a correlation coefficient between the first image and the second image. A pixel value Z of the synthesized image is represented by the following equation (7) with a pixel value of the adjustment map 400 as a weight w.

$$Z=wY1+(1-w)Y2 \tag{7}$$

When the weight w is calculated based on the correlation between the two images, and when the correlation therebetween is high, it is considered that accuracy of a result obtained by the image-to-image conversion processing S41 is high, such that the weight of the output Y1 is increased. As a result, in an area where the correlation is high, the high image quality with high accuracy is obtained by using a guide image (here, the T2W image), and in an area where the correlation is low, an image in which a lot of general high image quality is reflected is obtained. When w is calculated based on, for example, the dispersion of the first image, and when the dispersion is large and the variation in the pixel value is large, it is considered that the accuracy of the result obtained by the image-to-image conversion processing S41 is low, such that synthesis is performed in a state where a weight of Y1 is reduced.

According to the embodiment, it is possible to prevent the accuracy of high image quality processing from deteriorating due to an influence such as a difference in the local structure between the guide image and the image to be processed and the noise in the guide image, and to maintain the accuracy of the high image quality processing (the second high image quality).

Figure 10:
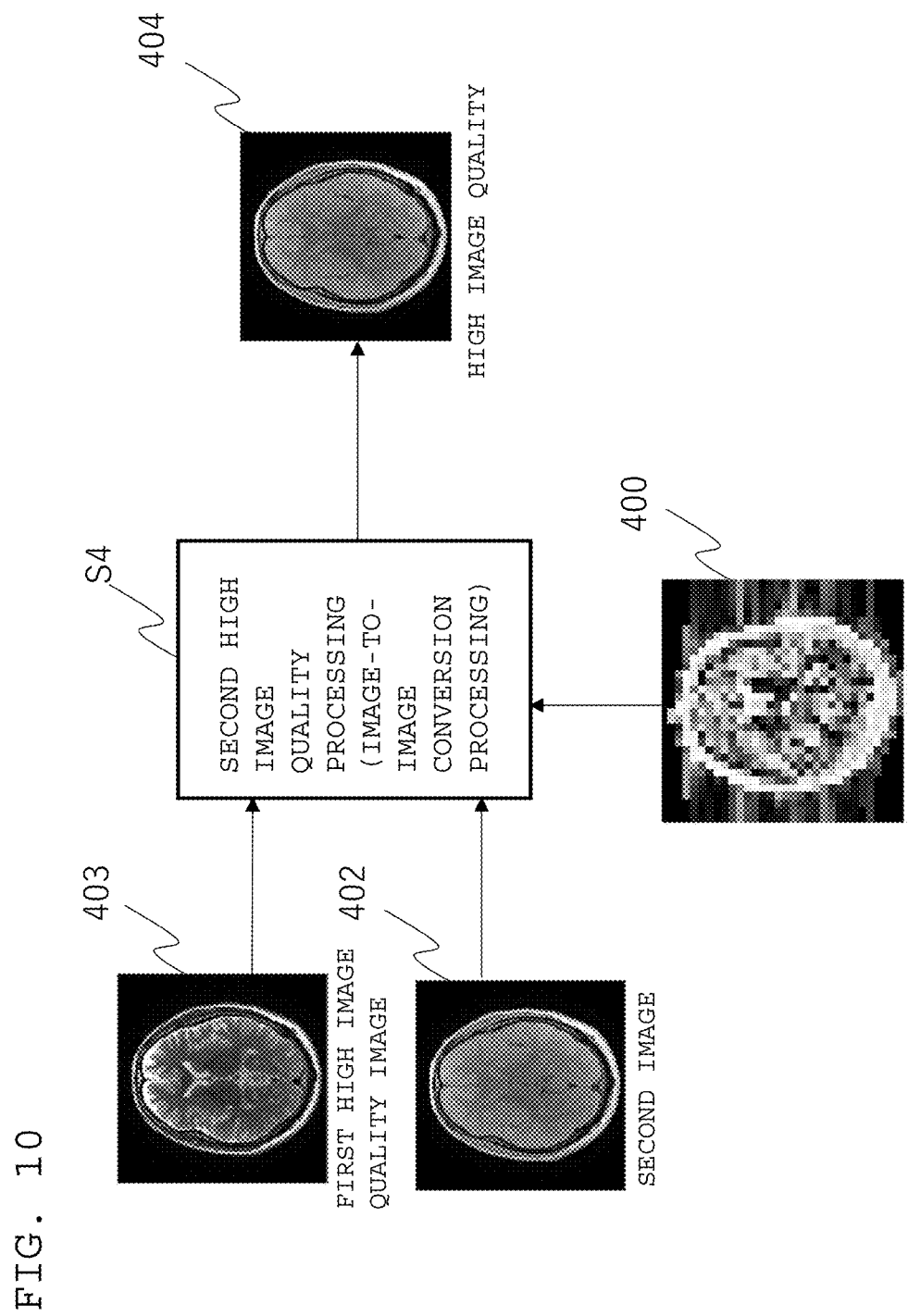
FIG. 10 is a diagram illustrating another example of the second high image quality processing of the second embodiment.

In the above description, the adjustment map 400 is applied when the respective outputs Y1 and Y2 of the image-to-image conversion processing S41 and the single high image quality processing S42 are synthesized, and as illustrated in FIG. 10, in the image-to-image conversion processing S41, the adjustment map 400 (the weight) can be applied to the first high image quality image 403 and the second image 402 which are the inputs. In this case, the processing is performed by using the following equation (8) instead of the equation (the equation (2)) of the image-to-image conversion processing S41 (for example, the guided filter).

$$z=wy+(1-w)(ax+b) \tag{8}$$

The second high image quality processing unit 240 can form the high image quality function with the CNN, use the first high image quality image, the second image, and the adjustment map as an CNN input, and output a second high image quality image that is subjected to local high image quality processing. As described in the modification of the first embodiment (FIG. 5), this CNN performs processing of matching the appearance characteristic of the image to be processed with the source image 402, and at this time, the processing is locally performed according to the adjustment map, thereby proving the high image quality.

While the specific processing of the second embodiment and the modification thereof are described above, various modifications and alternative units described in the first embodiment can also be applied to the embodiment alone or in combination thereof as long as the various modifications and alternative units are not technically inconsistent, and the present invention includes such modifications.

What is claimed is:
1. An image processing device, comprising:
an image receiving unit configured to receive, from a same target, a first image and a second image having a different type from that of the first image, the first image and the second image being images captured by an MRI (magnetic resonance imaging) device;
a first high image quality processing unit configured to generate a first high image quality image by processing the first image which constitutes a low-quality image received by the image receiving unit, by using a high image quality function, which is learned, to provide high image quality of the first high image quality image corresponding to the first image which constitutes a low-quality image captured by the MRI device;
a second high image quality processing unit configured to generate a second high image quality image, by applying a different high image quality processing on the second image which constitutes a low-quality image captured by the MRI device, with the first high image quality image, which is generated by the first high image quality processing unit, being a guide image for the different high image quality processing applied to the second image; and
a map calculation unit configured to calculate, by using (i) the first high image quality image and (ii) one of the first image or the second image being a low-quality image, an adjustment map that includes, for each pixel of the adjustment map, a corresponding weight for weighting the pixel and for adjusting high image quality processing in the second high image quality processing unit, wherein the different high image quality processing by the second high image quality processing unit includes synthesizing, by using the adjustment map as the weight for each pixel or each patch, the second high image quality image.

2. The image processing device according to claim 1, further comprising:
a learning unit configured to learn the high image quality function.

3. The image processing device according to claim 1, wherein the high image quality function is formed of a convolutional neural network.

4. The image processing device according to claim 1, wherein the high image quality function is a learning model learned by using, as learning data, the first image without an artifact, and the first high image quality processing unit generates an image without the artifact as the first high image quality image.

5. The image processing device according to claim 1, wherein the high image quality function is a learning model learned by using, as learning data, a high resolution image of the first image, and the first high image quality processing unit generates a high resolution generated image as the first high image quality image.

6. The image processing device according to claim 5, wherein
the first high image quality processing unit includes a plurality of high image quality functions, in which either one of configuration and learning is different, depending on a ratio of a reconstruction matrix to a measurement matrix of the first image, and selects a high image quality function to be used from the plurality of high image quality functions based on the ratio of the reconstruction matrix to the measurement matrix of the first image received by the image receiving unit.

7. The image processing device according to claim 1, wherein the second high image quality processing unit performs high image quality processing by using one or more high image quality functions selected from a guided filter, a joint bilateral filter, and a neural network.

8. The image processing device according to claim 1, wherein the map calculation unit calculates a correlation between the first image and the second image, and calculates the adjustment map by using the correlation therebetween.

9. The image processing device according to claim 1, wherein the second high image quality processing unit performs locally high image quality processing by using the adjustment map in the high image quality processing using the first high image quality image and the second image.

10. The image processing device according to claim 1, wherein the first image and the second image are different in at least one of modality, contrast, an imaging parameter, or imaging time.

11. A magnetic resonance imaging device, comprising:
an imaging unit configured to generate a nuclear magnetic resonance signal in an examination target, and to collect the nuclear magnetic resonance signal generated from the examination target; and
a computer configured to process the nuclear magnetic resonance signal and generate an image, wherein the computer includes the image processing device according to claim 1.

12. The image processing device according to claim 1, wherein for each pixel of the adjustment map, the weight for weighting the pixel is calculated based on reliability of the pixel.

13. An image processing method, comprising:
an image receiving step of receiving, from a same target, a first image and a second image, the first image and the second image being images captured by an MRI (magnetic resonance imaging) device;
a first high image quality step of generating a first high image quality image by processing the first image which constitutes a low-quality image received in the image receiving step, by using a first high image quality function, which is learned, to provide high image quality of the first high image quality image corresponding to the first image which constitutes a low-quality image captured by the MRI device;
a second high image quality step of generating a second high image quality image, by applying a different high image quality processing on the second image which constitutes a low-quality image, with the first high image quality image, which is generated in the first high image quality step, being a guide image for the different high image quality processing applied to the second image captured by the MRI device;
a map calculation step of calculating, by using (i) the first high image quality image and (ii) one of the first image or the second image being a low-quality image, an adjustment map that includes, for each pixel of the adjustment map, a corresponding weight for weighting the pixel and for adjusting high image quality processing in the second high image quality step; and
an image synthesis step of synthesizing, by using the adjustment map as the weight for each pixel or each patch, the second high image quality image generated by the second high image quality step.

14. The image processing method according to claim 13, wherein for each pixel of the adjustment map, the weight for weighting the pixel is calculated based on reliability of the pixel.

15. The image processing method according to claim 13, wherein the first high image quality function includes a learning model learned by using, as learning data, the first image without an artifact, and an image without the artifact is generated as the first high image quality image.

16. The image processing method according to claim 13, wherein the first high image quality function includes a learning model learned by using, as learning data, a high resolution image of the first image, and a high resolution generated image is generated as the first high image quality image.

17. The image processing method according to claim 13, wherein in the map calculation step, a correlation between the first image and the second image is calculated, and the adjustment map is calculated by using the correlation therebetween.

18. The image processing method according to claim 13, wherein in the second high image quality processing step, locally high image quality processing is performed by using the adjustment map in the high image quality processing using the first high image quality image and the second image.

* * * * *